(12) United States Patent
Zhang et al.

(10) Patent No.: US 7,506,274 B2
(45) Date of Patent: Mar. 17, 2009

(54) SYSTEM AND METHOD FOR INTERACTIVELY DISPLAYING MULTI-DIMENSIONAL DATA

(75) Inventors: Benyu Zhang, Beijing (CN); Teresa B. Mah, Bellevue, WA (US); Lee Wang, Kirkland, WA (US); Julie L. Hesseltine Richardson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 585 days.

(21) Appl. No.: 11/132,008

(22) Filed: May 18, 2005

(65) Prior Publication Data

US 2006/0262145 A1     Nov. 23, 2006

(51) Int. Cl.
   *G06F 3/048*    (2006.01)
(52) U.S. Cl. .................. 715/854; 715/853; 707/100; 707/101; 707/102; 345/440
(58) Field of Classification Search ............. 715/509, 715/853, 854, 907; 707/100, 101, 102; 345/440
See application file for complete search history.

(56) References Cited

U.S. PATENT DOCUMENTS

| | | | | |
|---|---|---|---|---|
| 5,136,690 A | * | 8/1992 | Becker et al. ............. | 715/853 |
| 5,581,797 A | * | 12/1996 | Baker et al. ............... | 715/708 |
| 6,304,260 B1 | * | 10/2001 | Wills ......................... | 715/853 |
| 6,496,208 B1 | * | 12/2002 | Bernhardt et al. .......... | 715/853 |
| 6,496,842 B1 | * | 12/2002 | Lyness ...................... | 715/206 |
| 6,963,339 B2 | * | 11/2005 | Leah et al. ................. | 345/440 |
| 7,310,784 B1 | * | 12/2007 | Gottlieb et al. ............ | 715/853 |
| 2004/0252128 A1 | * | 12/2004 | Hao et al. .................. | 345/581 |
| 2005/0066277 A1 | * | 3/2005 | Leah et al. ................. | 715/712 |

OTHER PUBLICATIONS

"Treemaps for space-constrained visualization of hierarchies," http://www.cs.umd.edu/hcil/treemap-history/, printed Aug. 12, 2005, 11 pages.
"Treemaps—ACM Transactions on Graphics," http://www.cs.umd.edu/hcil/treemap/, Oct. 2002, 25 pages.

* cited by examiner

*Primary Examiner*—Steven P Sax
*Assistant Examiner*—Grant D Johnson
(74) *Attorney, Agent, or Firm*—Senniger Powers LLP

(57) ABSTRACT

Methods and systems for displaying data retrieved from a multi-dimensional data source via an interactive data diagram. A graphical user interface is responsive to input from a user to retrieve multi-dimensional data for display via an interactive data diagram. The interactive data diagram displays multi-dimensional data in a hierarchical structure that includes a plurality of dimension levels and one or more member levels within each dimension level. A user specifies a change to the display structure by selecting a displayed member level in the hierarchical structure. The interactive data diagram is responsive to the user specified change to generate a drilled down data diagram displaying detailed dimension and member levels related to the selected member level.

14 Claims, 7 Drawing Sheets

SYSTEM AND METHOD FOR INTERACTIVELY DISPLAYING MULTI-DIMENSIONAL DATA

TECHNICAL FIELD

The present invention relates to the field of information retrieval and database processing. In particular, this invention relates to improvements in displaying and interacting with data diagrams displaying multi-dimensional data.

BACKGROUND OF THE INVENTION

Multi-dimensional data sources are commonplace in organizations worldwide. Such multi-dimensional data sources often contain large amounts of data (e.g., up to and exceeding a terabyte of data) that can be difficult to display and navigate. Data diagrams, such as tree maps, allow a user to view such data in organized levels. Displaying data in a hierarchy such as this provides an efficient means for viewing multi-dimensional data. However, existing data diagrams are static in nature. That is, once multi-dimension data is presented in the data diagram, the user cannot interact directly with the data diagram to dynamically modify its appearance. Rather, if the user desires to view additional detail regarding information displayed in the data diagram, the user must enter additional information to generate a new tree map. Moreover, conventional data diagrams are limited by their inability to interact with the user and provide an analysis of the data shown in the diagrams.

For these reasons, improvements in displaying data in a multi-dimensional hierarchy for navigation by a user and optimization of consumption of the display area is desired to address one or more of these and other disadvantages.

SUMMARY OF THE INVENTION

Embodiments of the invention overcome one or more deficiencies in the prior art by providing an interactive data diagram responsive to user input to dynamically modify organized levels being displayed in the data diagram. By providing an interactive data diagram, aspects of the present invention allow users to avoid additional data entry and readily identify and view additional detail regarding information in a multidimensional data set.

In accordance with one aspect of the invention, one or more computer-readable media having computer-executable components for presenting a visual representation of data retrieved from a multi-dimensional data source via an interactive data diagram is provided. The interactive data diagram displays a plurality of dimension rectangles each having one or more member rectangles. Each of plurality of dimension rectangles and one or more member rectangles have a visual property. A diagram component calculates a first visual property value for each of the plurality of dimension rectangles and corresponding one or more member rectangles as a function of the retrieved data, and displays the plurality of dimension rectangles and one or more member rectangles according to the calculated first visual property values. A user interface component receives input data from a user. The input data defines drill down data that includes information representative of a selected member rectangle of the at least one of the dimension rectangles. A drill down component calculates a second visual property value for each remaining dimension rectangle, and corresponding one or more member rectangles of the plurality of dimension rectangles from which the drill down data was not selected. The second visual property value defines a visual appearance of the respective remaining dimension rectangle as a function of drill down data and the one or more member rectangles included therein corresponding to the selected member rectangle. The diagram component is responsive to the received input data for displaying the remaining dimension rectangles and corresponding one or more member rectangles according to second visual property values.

In accordance with another aspect of the invention, method for adjusting a display of a user interface (UI) displaying data retrieved from a multi-dimensional data source is provided. The multi-dimensional data source is organized according to a plurality of dimensions that each includes at least one member. The method includes generating a hierarchical display structure for displaying information representative of a selected set of dimensions from the plurality of dimensions. The dimensions each have an initial visual property value defining a visual appearance of the respective dimension as a function of one or more members included therein. The method also includes receiving a user-specified change to the display structure. The user-specified change defines requested drill down data from at least one of the dimensions of the selected set of dimensions. The requested drill down data includes information representative of a selected member of the at least one of the dimensions. The method also includes calculating a new visual property value for each remaining dimension of the selected set of dimensions from which the drill down data was not requested. The new visual property value defines a visual appearance of each of the respective remaining dimensions as a function of drill down data and of the one or more members included therein corresponding to the selected member. The method further includes generating a new hierarchical display structure for displaying information representative of the remaining dimensions of the selected set of dimensions according to the new visual property values.

In accordance with yet another aspect of the invention, a computer system having a graphical user interface (UI) for displaying data retrieved from a multi-dimensional data source provides a method for adjusting the display of the UI comprising. The multi-dimensional data source is organized according to a plurality of dimensions that each including at least one member. The method includes generating a tree map that displays a plurality of dimension rectangles representative of a selected set of dimensions from the plurality of dimensions. The plurality of dimension rectangles each have at least one member rectangle representative of the at least one member included in the respective dimension. The dimension and member rectangles each have an initial visual property value that defines a visual appearance of the respective dimension rectangle and corresponding member rectangle as a function of the retrieved data. The method also includes receiving a user-specified change to the display structure. The user-specified change defines requested drill down data from at least one of the dimension rectangles and comprises information representative of a selected member rectangle of at least one of the dimension rectangles. The method also includes calculating a new visual property value for each remaining dimension rectangle of the plurality of dimension rectangles from which the drill down data was not requested. The new visual property value defines a visual appearance of the respective remaining dimension rectangle as a function of drill down data and of the one or more members rectangles included therein corresponding to the selected member rectangle. The method further includes generating a new tree map for displaying information representative of the remaining dimension rectangles according to the new visual property values.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings

DETAILED DESCRIPTION OF THE INVENTION

Figure 1:
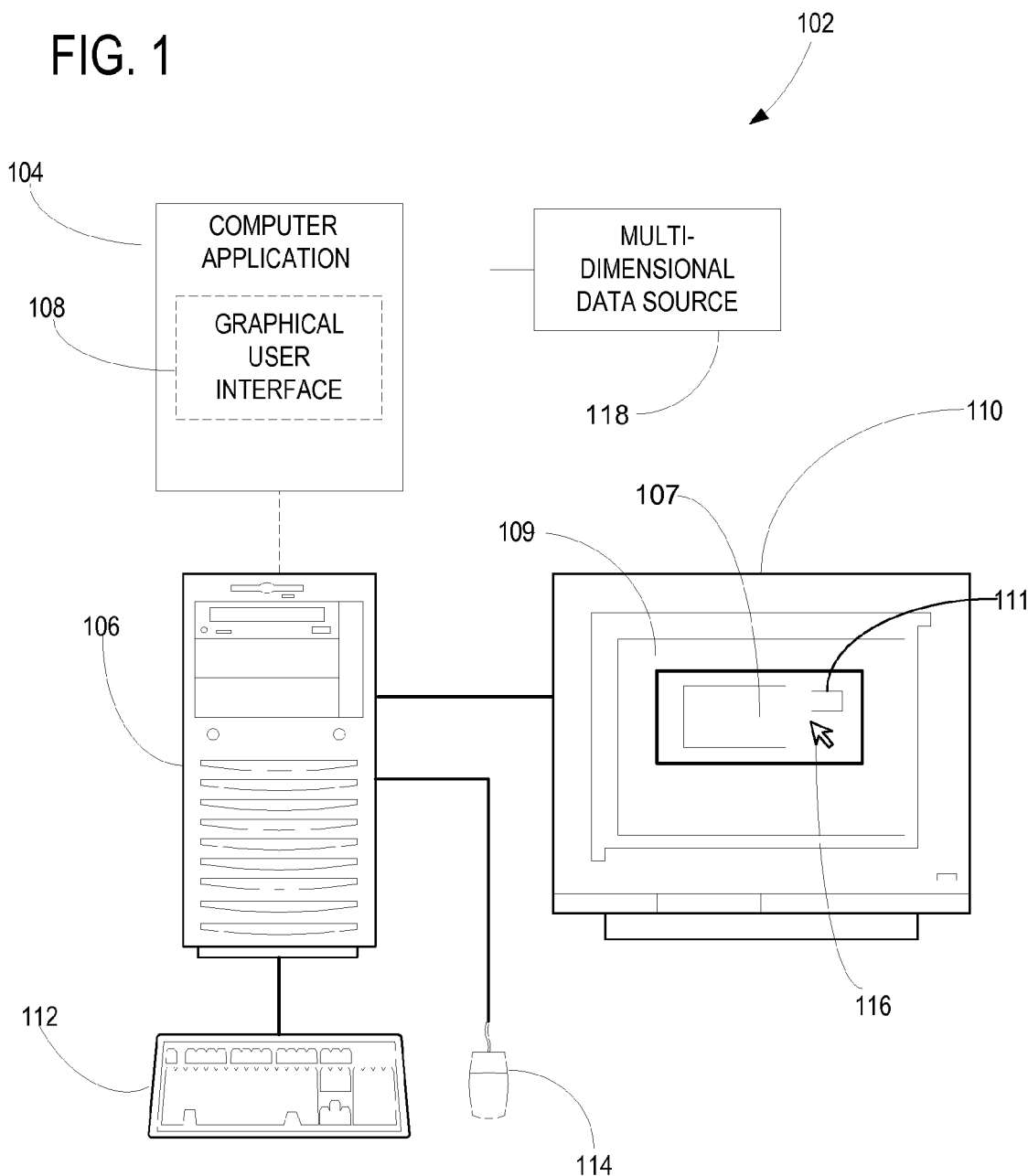
FIG. 1 is a block diagram of a computer system embodying aspects of an embodiment of the present invention.

FIG. 1 illustrates basic components of a computer system 102 used in connection with one embodiment of the present invention. Aspects of the invention relate to a computer application 104 that, when executed by a computer 106, retrieves, multi-dimensional data, and presents an interactive data diagram 107 via a graphical user interface (UI) 108. The UI 108 is presented to a user on a computer display screen 109 of a monitor 110 of the computer system 102. The UI 108 is preferably implemented as part of an operating system that provides an environment for displaying and managing window objects of the operating system. For example, the UI 108 presents of control elements or components 111 such as text entry fields, list boxes, and scroll bars objects 120 on the display 109 that allow the user to perform a desired operation or define data to retrieve from the multi-dimensional data source for display via the data diagram 107.

Although the present invention is described in conjunction with a conventional desktop computer, it will be appreciated that the present invention may be utilized in other types of computer systems that use a window-based display system. In one embodiment, the computer 106 receives input data from an input device such as a conventional keyboard 112. Those skilled in the art are familiar with the use of cursor keys on the keyboard 112, a mouse 114, trackball, or other pointing device to move a cursor 116 on the display 109 for the selection of various options. It should be appreciated by those skilled in the art that text entry or command input also may be accomplished by using a touch-sensitive pad or handwriting recognition device in conjunction with software for recognizing the corresponding input signals as selection signals.

A multi-dimensional data source 118 stores multi-dimensional data. As known to those skilled in the art, multi-dimensional data can be separated into various categories, or dimensions, and each category can be separated into one or more groupings, or members. For example, consider a multi-dimensional data set containing user data relating to usage of a particular Web service. One measure of data included in such a multi-dimensional data set may be user counts. User counts can be broken down into different categories such as a gender, age, income, and country of residence (country). As an example of category separation, the gender category can be separated into groupings of total male users, total female users, and total other users. The terms "other users" refer to the total number of users of the web service which have not provided gender information. The various categories and groupings within a particular multi-dimensional data set can be illustrated to the user via data diagram such as a tree map, or any other hierarchical data diagram used to efficiently display multi-dimensional data. Although it is contemplated that the invention can be used with any such data diagrams, for purposes of illustration the invention is described herein as providing an interactive tree map.

Figure 2:
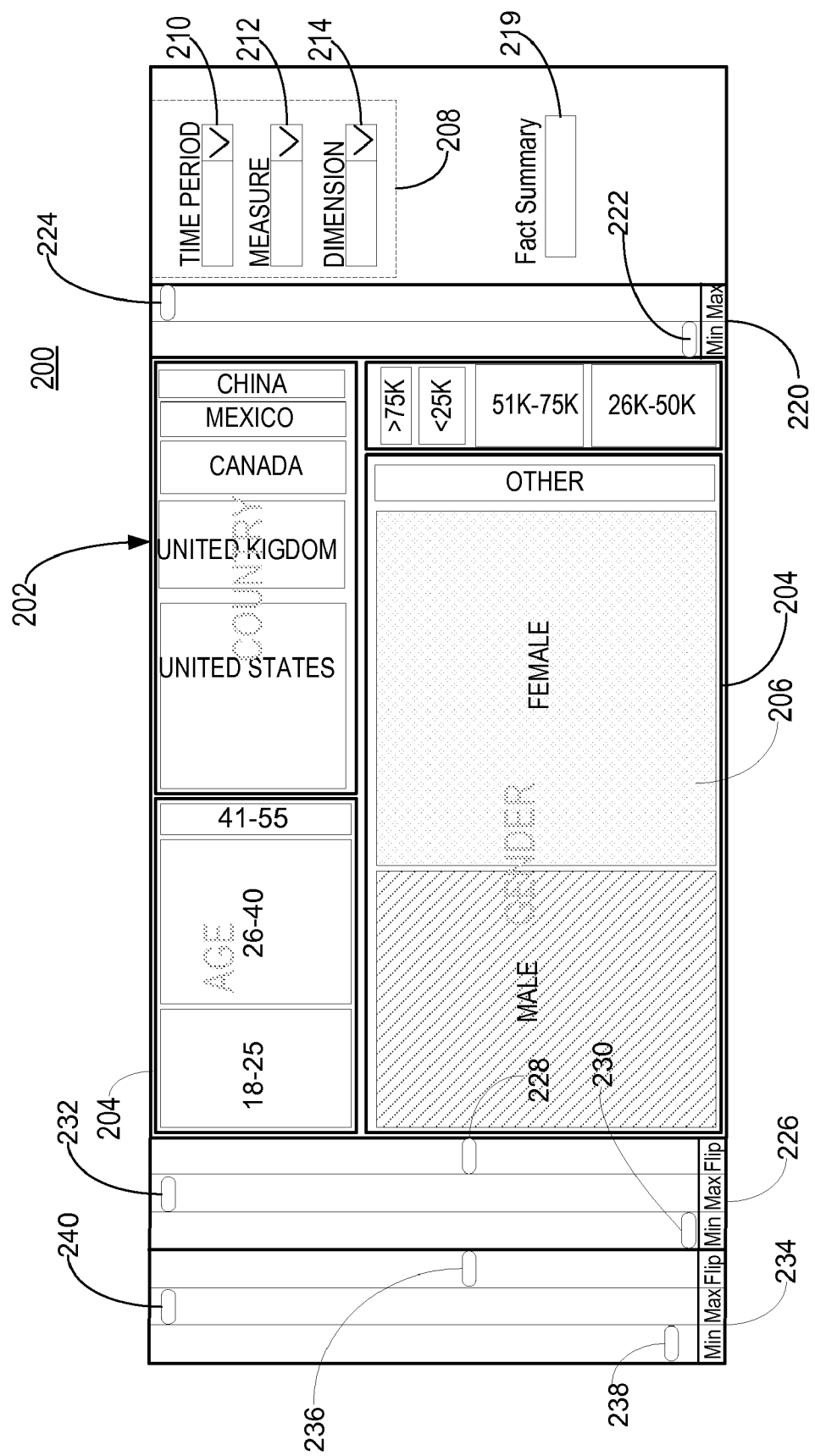
FIG. 2 is an exemplary graphical user interface being displayed on a display according to an embodiment of the invention.

Referring briefly to FIG. 2, a block diagram illustrates an exemplary UI 200 (e.g., UI 108) presenting a tree map 202. In this instance, the tree map 202 displays multi-dimensional data corresponding to users of a web service such as described above. The tree map 202 is a special type of visualization tool in which multi-dimensional data is organized into a hierarchy comprising dimension rectangles, such as indicated by reference character 204, and member rectangles 206, such as indicated by reference character 206. Each dimension rectangle 204 corresponds to a particular dimension (i.e., category) of multi-dimensional data and includes at least one member rectangle 206, which corresponds to particular member (i.e., grouping) within a particular dimension. In this case, tree map 202 includes a dimension rectangle 204 for each of the following dimensions: gender, age, income, and country of residence. The dimension rectangle 204 corresponding to gender includes a member rectangle for each of the following members: male, female, and others. The dimension rectangle 204 corresponding to age includes a member rectangle 206 for each of the following members: 18-25 years, 26-50 years, and 51-75 years. The dimension rectangle 204 corresponding to annual income includes a member rectangle 206 for each of the following members: less than $25,000, $26,000-50,000, $51,000-75,000, and greater than $75,000. In the illustrated embodiment, the dimension rectangle 204 corresponding to country of residence includes a member rectangle 206 for each of the following members: United States, United Kingdom, Canada, Mexico, and China. The user may use various control elements 208 (e.g., list boxes, text boxes, and drop down list) in the UI 200 to define the type and range of data to retrieve from the data source 118, and the various dimensions to display in the tree map 202. For example, a time period control 210 defines a desired time period (e.g., May 2004) for the data to retrieve from the data source 118. A measure control 212 allows the user to define a measure (i.e., type) of data (e.g., user counts) to retrieve. A dimension control allows the user to define the various dimensions to display in the tree map 202. For purposes of illustration, assume the user has designated user counts as the measure for the data to retrieve from the data source 118. The size of each member rectangle 206 corresponds to the ratio of the number of users within a particular member to the total number of users.

While conventional tree maps allow management personnel to view business activities, frequently users are interested in viewing more specific information with respect to specific members within a particular dimension. For example, rather than viewing an age dimension rectangle 204 that includes member information for all genders, the user may desire to visualize member rectangles 206 corresponding to female users only. Unfortunately, existing tree map structures are static in nature. That is, once multi-dimensional data is presented in a tree map, the user cannot interact directly with the tree map to modify its appearance. Rather, if the user desires to view additional detail regarding a specific group or member (e.g., rectangle 206), the user must supply new input data such as a new measure to generate an entirely new tree map. Particularly when analyzing large databases, generating new tree maps creates undesirable, time-consuming delays.

Returning to FIG. 1, the system 102 allows improved analysis of multi-dimensional data via a data diagram 118 being displayed on the display 109. More specifically, the present invention provides an interactive data diagram 107 within a UI 108 responsive to input from a user to dynamically modify the appearance of dimension and member rectangles within the data diagram 107. According to the present invention, a user uses the UI 108 to interact directly with the data diagram 107 being displayed on the display 109 to perform a desired operation. Advantageously, aspects of the present invention provide an interactive data diagram 107 that allows a user to perform a drill down operation in order to view additional detail regarding particular member data within a particular dimension of the multi-dimensional data. For example, when the user identifies a particular member rectangle 206 in a tree map 202 for which additional detail is desired, the user interacts directly with the tree map by, for example, positioning a mouse cursor 116 over the member rectangle and clicking mouse 114. By providing an interactive data diagram 107, the present invention allows a user to more readily identify and view additional detail regarding information in a multidimensional data set.

Figure 3:
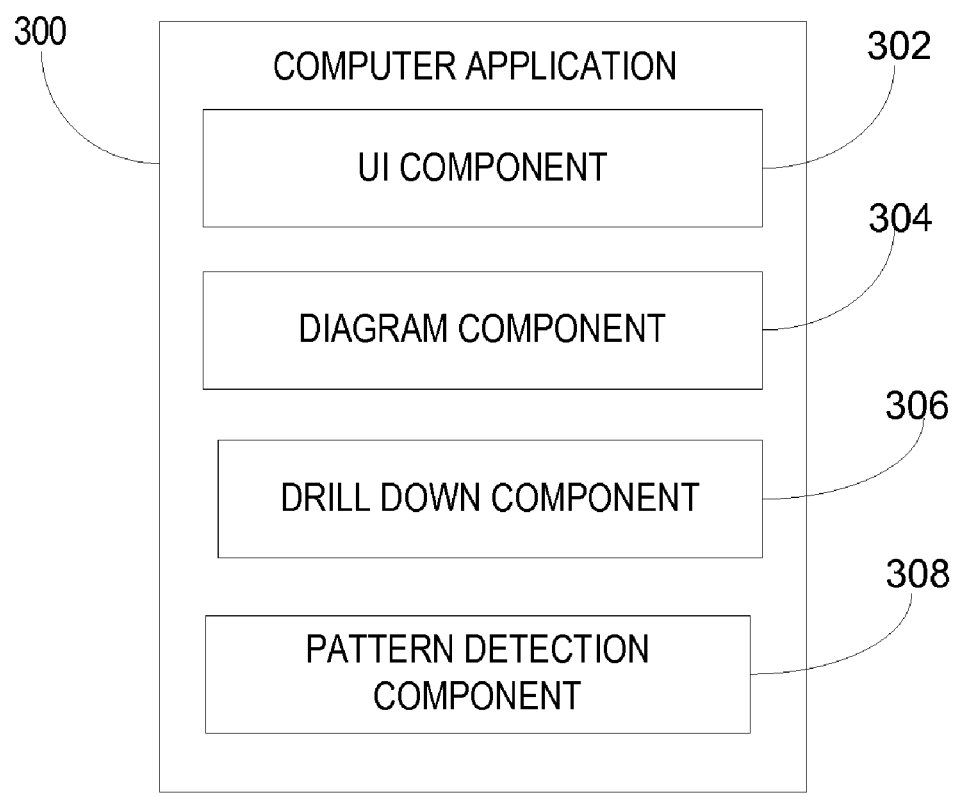
FIG. 3 is a block diagram illustrating the components of a computer application according to an embodiment of the invention.

Referring now to FIG. 3, a block diagram illustrates components of a computer-readable medium (CRM) 300 (e.g., application 104) configured for presenting multi-dimensional data via an interactive tree map 107 on a display 108. The CRM 300 includes computer-executable instructions, such as a UI component 302 for receiving input from a user defining data to retrieve from the multi-dimensional data source 118. For example, referring briefly again to FIG. 2, the UI component 302 is responsive to input data defined via the time period control 210, measure control 212, and a dimension control 214, to retrieve corresponding data from the multi-dimensional data source 118.

A diagram component 304 is responsive to the retrieved data to generate a tree map 202 to provide a visual representation of the retrieved multi-dimensional data. As described above, the tree map 202 organizes multi-dimensional data retrieved from a multi-dimensional data source 118 into a hierarchy comprising dimension rectangles 204 and member rectangles 206. Each of the dimension and member rectangles 204, 206 has one or more visual properties, the value of which determines the appearance of the respective dimension and member rectangles 204, 206. For example, a size property determines the size of dimension rectangles and the relative size of member rectangles within a particular dimension rectangle. The size property of a dimension rectangle 204 may be determined as a function of the number of dimensions (i.e., categories) of multi-dimensional data the user desires to view. For example, if the user desires to view four dimensions of the multi-dimensional data, each of the dimension rectangles 204 in the resulting tree map 202 will use one-fourth (¼) of the viewable area of the tree map 202. The size of each member rectangle 206 within a particular dimension rectangle 204 is determined as a function of the number of different members within that particular dimension. For example, consider the multi-dimensional data source includes the multi-dimensional data listed in the Table 1 regarding to gender.

TABLE 1

| GENDER | WEB SERVICE USERS |
|--------|-------------------|
| FEMALE | 450,00 |
| MALE | 600,000 |
| OTHER | 50,000 |

In this case, the total number of male users using the web service is greater than the total number of female users using the service. Accordingly, the size property value for the male member rectangle within the gender dimension rectangle is greater than the size property value for the female member rectangle and the other member rectangle and, thus, represented by a larger rectangle. Similarly, since the total number of female users is greater than the total number of other users, size property value for the female member rectangle within the gender dimension rectangle is greater than size property for the other member rectangle.

A color property determines the color of the dimension and member rectangles 204, 206, and a border property determines the border thickness of dimension and member rectangles 204, 206 to be displayed via the tree map 202. The diagram component 304 calculates an initial visual property value for each of the dimension rectangles and the one or more member rectangles being displayed as a function of the retrieved data. Thus, the diagram component 304 displays a tree map 202 having dimension rectangles and member rectangles according to the initial calculated visual property values.

A drill down component 306 is responsive to drill down data specified by the user via the tree map 202 to reconfigure the tree map 202 to illustrate additional detail regarding a particular member rectangle. The user specifies drill down data, for example, by positioning a cursor (e.g., cursor 116) over a particular member rectangle 206 within a dimension rectangle 204 and clicking the mouse 114. The drill down component 306 is responsive to the specified drill down data to calculate a new visual property value for each of the remaining dimension rectangles and their one or more member rectangles as a function of the retrieved data component and the specified drill down data. The diagram component 304 is responsive to the specified drill down data to display a drilled down tree map having dimension rectangles and member rectangles according to the calculated new property values.

In one embodiment, the UI component 302 is responsive to user input (e.g., right clicking the mouse) to display a menu (not shown) that includes controls that allow the user to add dimensions (i.e., dimension rectangles) to the screen at any time.

Figure 4A:
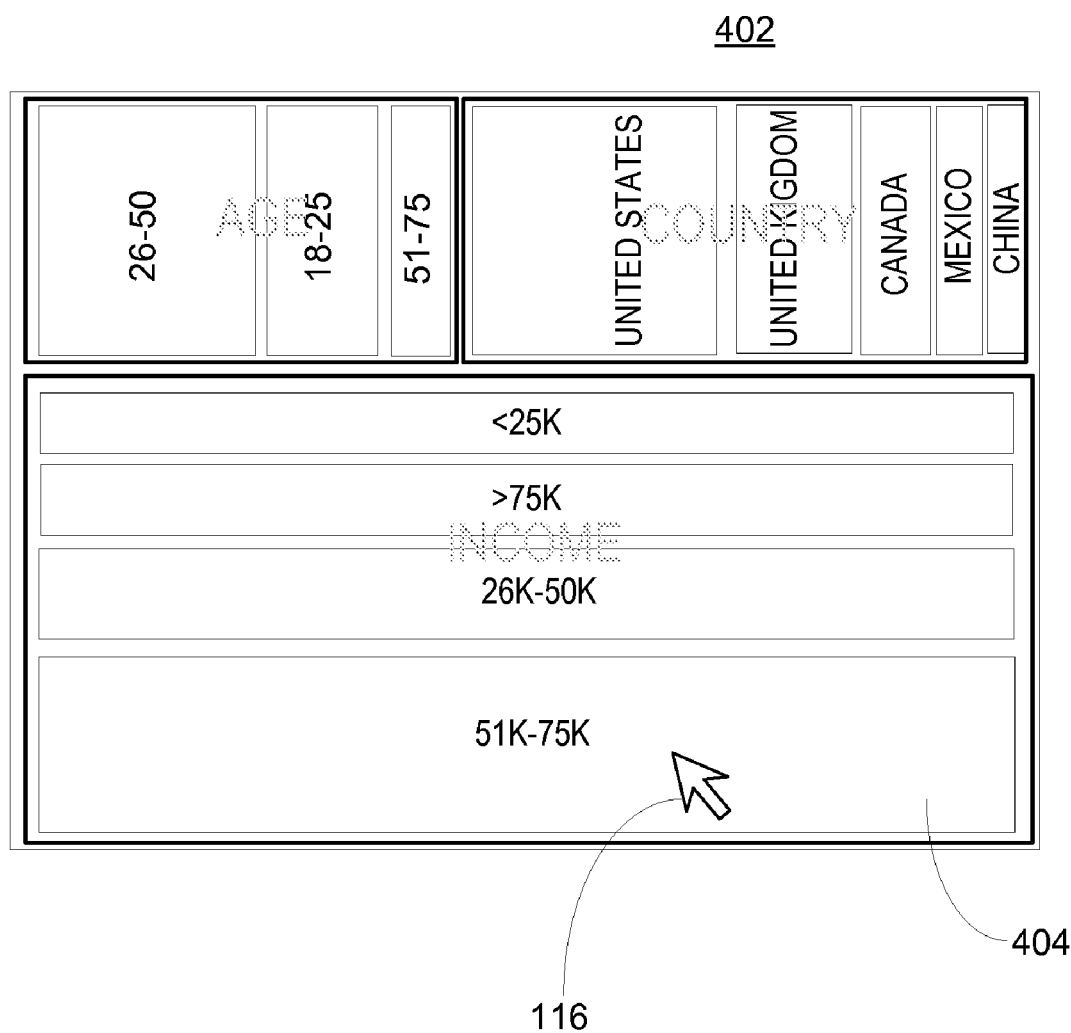
FIGS. 4A and 4B are exemplary drilled down tree maps being displayed on a display according to an embodiment of the invention.
Figure 4B:
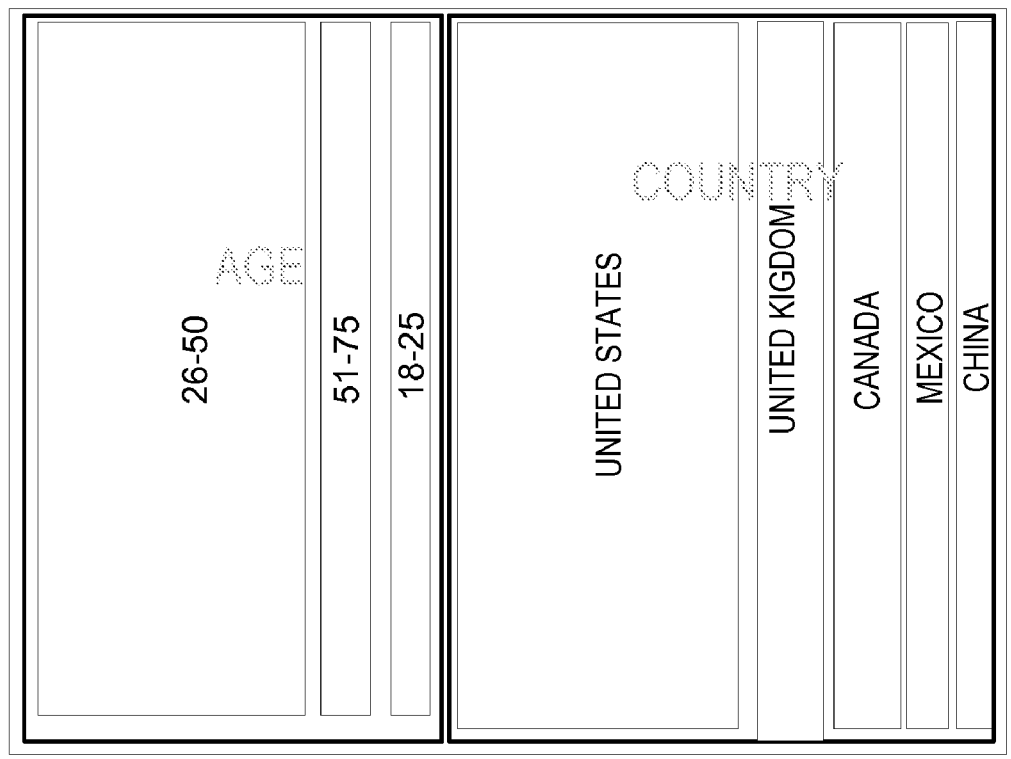

FIG. 4A illustrates an exemplary drilled down tree map 402 resulting from a user clicking the female member rectangle of the tree map shown in FIG. 2. As a result of specifying the member rectangle corresponding to female users, the drill down component 306 generates a drilled down tree map 402 displaying dimension and member data related to female users only. That is, each of the member rectangles, such as indicated by 404, in the drilled down tree map 402 corresponds to female users. After viewing the drilled down tree map 402, the user can readily determine that the majority of female users using the web service are between the ages of 26 and 50, reside in United States, and have an annual income between $51,000 and $75,000 per year. Notably, a dimension rectangle corresponding to gender is not shown because female users correspond to the measure of the data being displayed. Advantageously, a user can continue performing drill down operations until only one dimension remains. For example, FIG. 4B illustrates a drill down operation performed on the drilled down tree map 402 shown in FIG. 4A. In this case, the user positions the cursor 116 over the member rectangle 404 in drilled down tree map 402 corresponding to the $51K-75K member in the income dimension and double clicks the mouse 114. As a result, a double drilled down tree map 406 is generated and displays dimension and member data related to female users having an annual income between $51,000 and $75,000 per year. After viewing the double drilled down tree map 406, the user can readily determine that the majority of females with an annual income between $51,000 and $75,000 that use the web service are between the ages of 26-50 and reside in United States.

Referring again to FIG. 2, the UI 200 includes a control element that allows the user to view a summary of the retrieved multi-dimensional data in terms of "What's Hot" or otherwise of interest to the user. More specifically, the UI 200 includes a control element such as a drop down list box 219 that allows the user to input a summary request (e.g. "what's hot") to modify visual properties of dimension and member rectangles 204, 206 within a tree map 202 as a function of detected patterns in the retrieved multi-dimensional data.

In one embodiment, determining what's hot includes identifying patterns in retrieved multi-dimensional data as function of the following factors: relevance, change, surprisingness, and interestingness. Notably, to detect interesting patterns in multi-dimensional data, it is important to consider each of the above factors as a whole. For example, consider country X has a ten-fold increase in the number of web service users from one month to the next, indicating that country X has experienced considerable change in the number of users. However, if the country's original user count was only 100 this does not mean that the country is necessarily "hot". On the other hand, a more relevant change occurs if country X's user count increased from ten million to one hundred million. Similarly, knowing that the country's user count has increased by ten-fold might not be as relevant or significant if user counts in all other countries also increased ten-fold during the same time period. However, a finding that country Y's user count increased by ten-fold while every other country's user count, decreased by ten-fold during the same period is surprising. In terms of interestingness, a user of the Web service residing in Korea may only be interested in Korean findings rather than findings related to the entire network.

Referring again to FIG. 3, the CRM 300 includes a pattern detection component 308 responsive to a summary request received from the user to determine a relevance score, a change score, a surprisingness score, and an interestingness score. The relevance score for a particular member corresponds to the percentage that particular member represents of the measure. As described above, measure refers to the type of data for which dimensions and members are identified. Thus, the relevance score, R, for a particular member in the tree map 202 is the percentage the particular member represents of total number of users. For example, within the country dimension, the United States (US) might represent 20% of all users, Canada might represent 8% of users, the United Kingdom (UK)) might represent 7% of users, Mexico might represent 6% of users, and China might represent 4% of users. Thus, the relevance scores for these members are as follows: US=0.2, Canada=0.08, UK=0.07, Mexico=0.06, and China=0.04.

The diagram component 304 is responsive to the calculated relevance scores, to modify a particular visual property value for each of the member rectangles. In this case, the diagram component 304 modifies the size property of each of the member rectangles 206 as a function of their relevance score. Thus, using the example relevance scores for the countries listed above, the member rectangle corresponding to the United States would have the largest member rectangle and China would have the smallest member rectangle.

The change score C for a particular member is calculated, for example, by comparing the relevance score for a particular member during a current time period to the relevance score for that same particular member during a previous time period. For example, the pattern detection component 308 may execute any one of the following equations to determine the change score, C.

$$R_{current}/R_{previous};\qquad(1)$$

$$R_{current}-R_{previous};\qquad(2)$$

$$R_{current}-\text{avg}(R_{overNPreviousTimePeriods});\qquad(3)$$

$$(R_{current}-R_{previous})/R_{previous};\qquad(4)$$

$$(R_{current}-R_{previous})/\log(R_{previous});\qquad(5)$$

$$(R_{current}-R_{previous})/\text{sqrt}(R_{previous});\qquad(6)$$

where $R_{current}$ is the relevance score for a particular member during the current time period, $R_{previous}$ is the relevance score for a particular member during the previous time period, and $R_{overNPreviousTimePeriods}$ is an average relevance score for a particular member over a number (N) of time periods.

The diagram component 304 modifies the color property of each of the member rectangles 206 as a function of their change score. Because the change score can indicate change in a positive direction or a negative direction, different colors are used to distinguish between positive change and negative change. For example, the color green can be used to indicate positive change and the color red can used to indicate negative change. Moreover, the greater the positive change, the darker the positive color of the member rectangle appears. Similarly, the greater the negative change, the darker the negative color of the member rectangle appears.

Various methods can also be used to calculate the surprisingness score S of a particular member. One such method is involves determining a difference between a forecasted, or predicted relevance value and the actual relevance value. If this method, a forecasting algorithm or simple regression is used to forecast a relevance value, $F_{current}$ for the current time period for a particular member based on previous time periods and trends. Accordingly, the pattern detection component 308 calculates surprisingness score S is calculated using the following equation:

$$\text{abs}((R_{current}-F_{current})/F_{current}).\qquad(7)$$

Another method for determining a surprisingness score S involves determining the difference between from a mean value for the member in a current time period compared to previous time periods. In this case, the pattern detection component 308 executes the following algorithm to calculate a surprisingness score, S:

$$\text{abs}((R_{current}-\text{Avg}(R_{overNPreviousTimePeriods})/\text{Stdev}_{overNPreviousTimePeriods}),\qquad(8)$$

where $\text{Stdev}_{overNPreviousTimePeriods}$ is the standard deviation of the relevance value for a particular member over a number (N) of time periods.

In yet another method, the pattern detection component 308 calculates the surprisingness score S is by executing the following modified chi squared algorithm:

$$(O_M-E_M)^2/E_M+(O_M-E_M)^2/(S_O-E_M), \quad (9)$$

where $O_M$ is the current observed value of the member, $E_M$ is the expected value of the member (based on previous time period value(s)), and $S_O$ is the sum of all current observed values for members in the dimension.

The diagram component 304 is responsive a calculated surprisingness value to modify the border thickness of each of the member rectangles 206 as a function of their surprisingness score S. For example, member rectangles 206 whose trends are more surprising than others will have a thicker rectangular outline than members whose trends are less surprising (i.e., lower surprisingness score).

In another embodiment of the invention, the diagram component 304 is responsive to threshold input data to modify the visual appearance of dimension and member rectangles 204, 206 being displayed via the tree map 202. More specifically, the user interacts with control elements available via the UI 200 to define threshold data for various what's hot factors in order to determine which dimension and member rectangles will be displayed via the tree map.

Referring again to FIG. 2, a size slider control 220 allows the user to define a target range of relevance scores for member rectangles 206 the user would like to view. By default, the size of the area in a member rectangle 206 dictates the relevance of the member. Members with larger relevance in the current time period will have larger member rectangles than those with smaller relevance. For example, from the tree map 202, it can be seen that male users have the greatest relevance score among all other members in the gender dimension. The size slider control 220 includes a minimum (min) size button 222 and a maximum (max) size button 224. The user adjust the position of the min and max size buttons 222, 224 along the slider control 220 to define a min size value, $T_{size\_min}$ and max size value $T_{size\_max}$ respectively. Alternatively, the user may use a computer keyboard to enter keystrokes that define the min and max size values. The diagram component 304 is responsive to the defined min and max size vales $T_{size\_min}$, $T_{size\_max}$ to only display member rectangles 206 whose relevance score is between $T_{size\_min}$ and $T_{size\_max}$ values.

A color slider control 226 allows the user to define a target range of change scores for member rectangles 206 which the user would like to view. In this case, the color slider control 226 includes a color threshold button 228 button that is used to define a color change threshold value $T_{color\_flip}$ at which change is considered positive or negative. In other words, a member rectangle having change score greater than a threshold value of $T_{color\_flip}$ is represented by the positive color (default green). A member rectangle 206 having change score less than $T_{color\_flip}$ is represented by the negative color (default red). Change equal to $T_{color\_flip}$ will be represented by the background color. The greater the change for a particular member from one time period to the next, the darker the color (positive or negative) for the member rectangle. In FIG. 2, in the gender dimension, the male member rectangle is colored green, as indicated by forward hatching, and the female member rectangle is colored red, as indicated by backward hatching, indicating that the amount of change in females for the current time period is below the threshold value $T_{color\_flip}$ of interest, while the amount of change in males is above $T_{color\_flip}$. The color slider 226 also includes minimum and maximum color buttons 228, 230 used to define a minimum change value $T_{color\_min}$ and maximum change value $T_{color\_max}$, respectively. The diagram component 304 is responsive to the defined min and max color vales $T_{color\_min}$, $T_{color\_max}$ to only display member rectangles 206 whose change scores are between $T_{color\_min}$ and $T_{color\_max}$. In one embodiment, a color gradient bar (not shown) is positioned along the color slider control 226 and indicates what the color will be at each point on the scale within the range. The colors in such a gradient bar also flip from red to green at the point indicated by the color change threshold value, $T_{color\_flip}$.

A border slider control 234 allows the user to define a target range of surprisingness scores for member rectangles 206 which the user would like to view. The border slider control 234 includes an outline threshold button 236 used to define a threshold surprisingness value, $T_{outline\_flip}$. The borders of member rectangles 206 having a surprising score S above the user defined threshold surprisingness value will be highlighted. The border slider control 234 also includes min and max buttons 238, 240, that are used to define a minimum change value $T_{outline\_min}$ and maximum change value $T_{outline\_max}$, respectively. The diagram component 304 is responsive to the defined min and max border values to only and only member rectangles 206 whose surprising values are between $T_{outline\_min}$ and $T_{outline\_max}$.

Notably, although the size, color, and border slider controls are described above as being used to define relevance, change, and surprisingness, respectively, it is contemplated that each of these controls can be configured to define relevance, change, or surprisingness.

Figure 5:
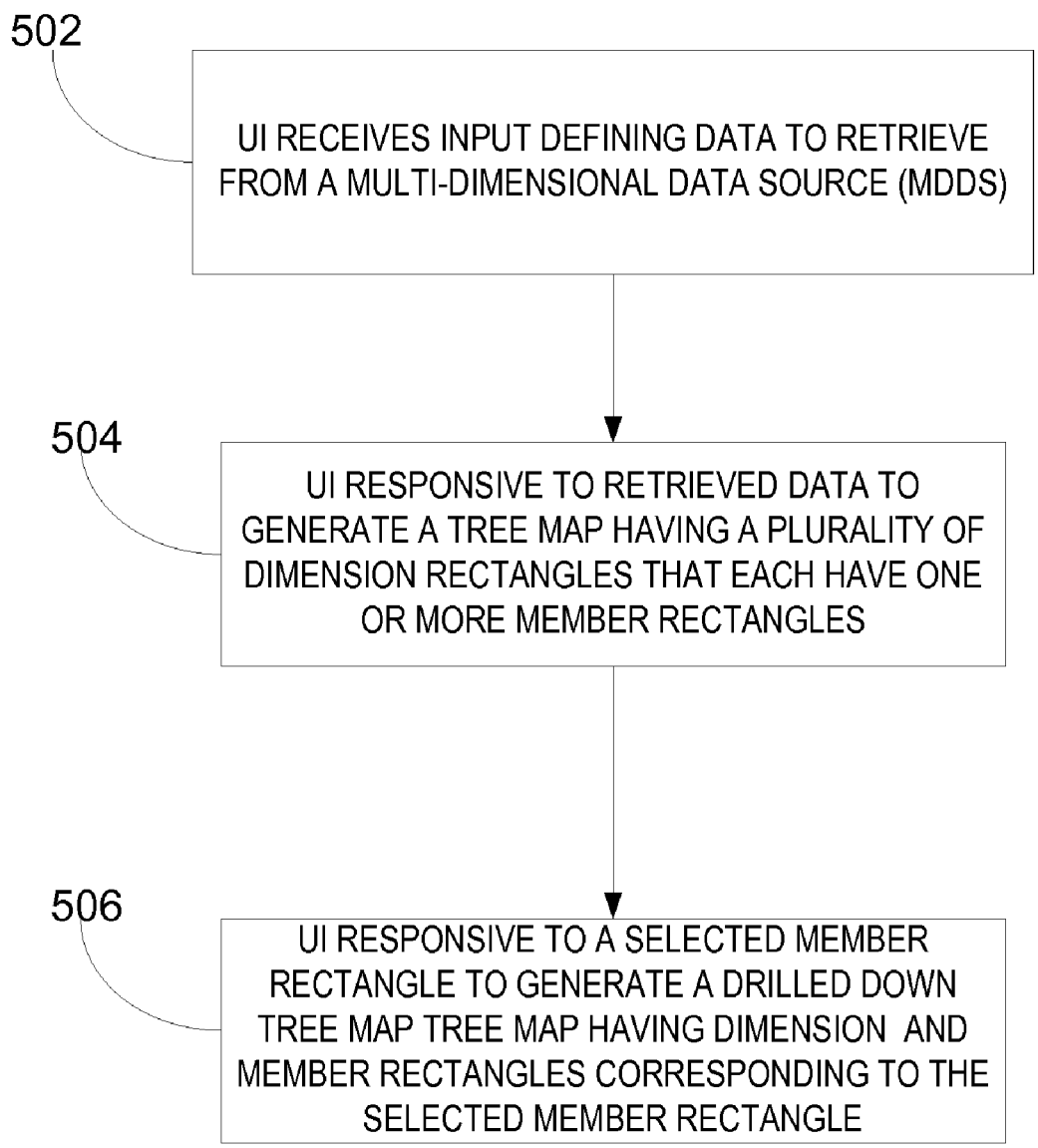
FIG. 5 is an exemplary flow chart illustrating a method of interacting with a UI displaying an interactive tree map according to one embodiment of the invention.

Referring now to FIG. 5, an exemplary flow chart illustrates a method of interacting with a UI displaying an interactive tree map according to one embodiment of the invention. At 502, the UI receives input data from a user defining multi-dimensional data to retrieve from a multi-dimensional data source. The UI generates a tree map in response to retrieved multi-dimensional data at 504. As described above in reference to FIG. 2, a tree map organizes multi-dimensional data into a hierarchy comprising dimension rectangles and member rectangles. Each dimension rectangle in the hierarchy includes at least one nested member rectangle. A dimension rectangle corresponds to a particular category of multi-dimensional data and member rectangles correspond to particular groupings within a particular category. At 506, the UI is responsive to a user selecting a member rectangle in the tree map to generate a drilled down tree map. The drilled down tree map displays dimension rectangles and member rectangles that are related to particular grouping that corresponds to the selected member rectangle.

Standard Computing Environment Description

Figure 6:
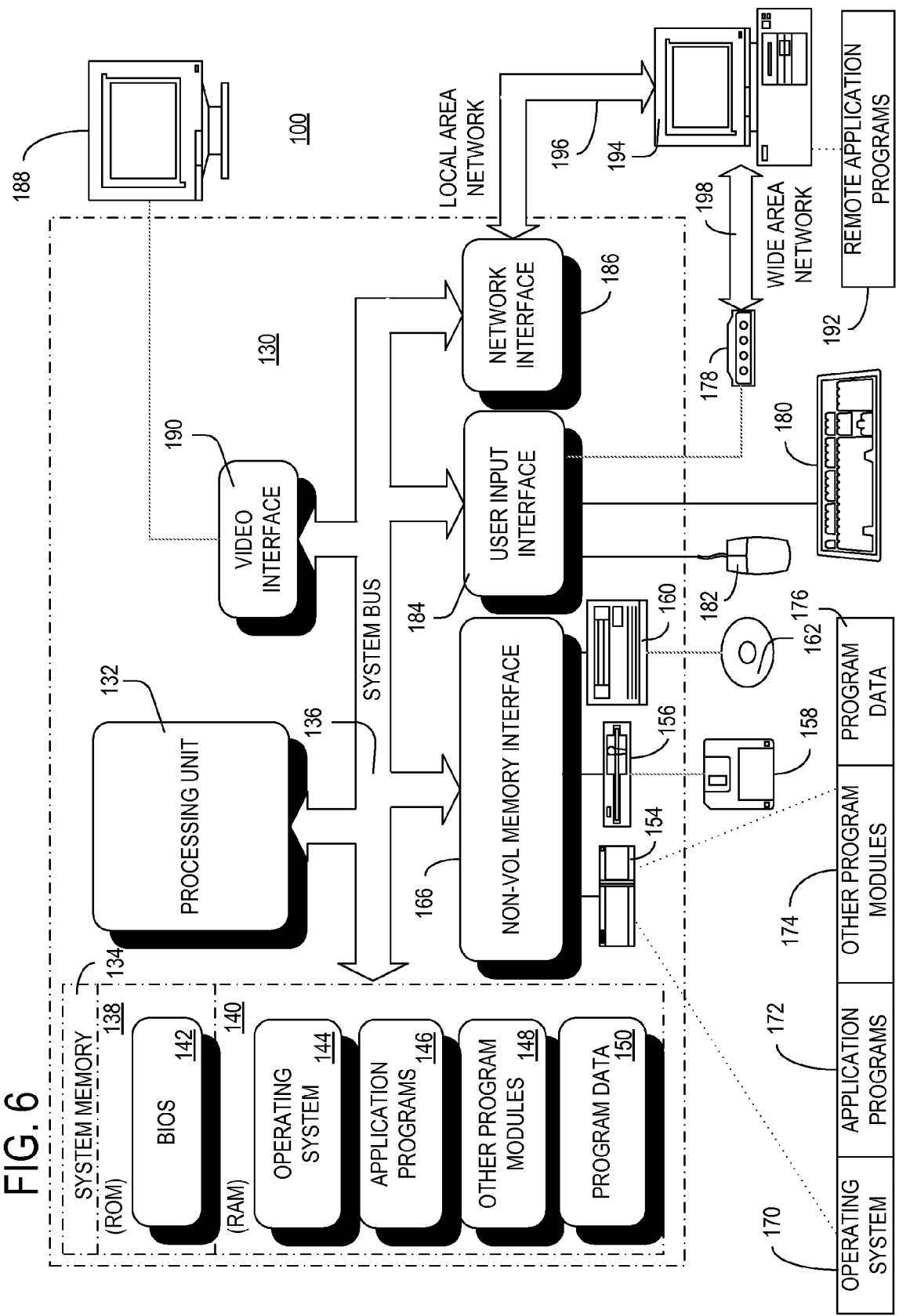
FIG. 6 is a block diagram illustrating one example of a suitable computing system environment in which the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between components within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the components described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 6.

The order of execution or performance of the methods illustrated and described herein is not essential, unless otherwise specified. That is, components of the methods may be performed in any order, unless otherwise specified, and that the methods may include more or less components than those disclosed herein. For example, it is contemplated that executing or performing a particular component before, contemporaneously with, or after another component is within the scope of the invention.

When introducing components of the present invention or the embodiment(s) thereof, the articles "a," "an," "the," and "said" are intended to mean that there are one or more of the components. The terms "comprising," "including," and "having" are intended to be inclusive and mean that there may be additional components other than the listed components.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

The invention claimed is:

1. One or more computer-readable storage media having computer-executable components for presenting a visual representation of data retrieved from a multi-dimensional data source via an interactive data diagram, said interactive data diagram representing a hierarchy and displaying a plurality of dimension rectangles each having one or more member rectangles, said plurality of dimension rectangles and one or more member rectangles each having a visual property, said computer-readable media comprising:

a diagram component for calculating a first visual property value for each of the plurality of dimension rectangles and corresponding one or more member rectangles as a function of the retrieved data, and displaying the plurality of dimension rectangles and one or more member rectangles according to the calculated first visual property values to maintain an original appearance of the hierarchy;

a user interface component for receiving input data from a user, said input data defining drill down data, said drill down data comprising information representative of a selected member rectangle of the at least one of the dimension rectangles;

a drill down component for calculating a second visual property value for each remaining dimension rectangle other than the selected member rectangle for a modified appearance of the hierarchy, and corresponding one or more member rectangles of the plurality of dimension rectangles from which the drill down data was not selected, said second visual property value defining a visual appearance of the respective remaining dimension rectangle as a function of drill down data and the one or more member rectangles included therein corresponding to the selected member rectangle, wherein the modified appearance is different from the original appearance of the hierarchy based on the removal of the selected member rectangle in response to calculating the second visual property value and without selection of new drill down data, and wherein the diagram component is responsive to the received input data for displaying the remaining dimension rectangles and corresponding one or more member rectangles according to second visual property values; and a pattern detection component responsive to a summary request received at the user interface component to calculate one or more pattern factor scores for each of the one or more member rectangles, said one or more pattern factor scores comprising one or more of the following: a relevance score, a change score, and a surprisingness score, said pattern detection component further calculating a summary visual property value for each of the one or more member rectangles as a function of the one or more pattern factor scores, said summary visual property comprising one or more of the following: a size property, a color property, or border thickness property, wherein the diagram component modifies the size property of each member rectangle as a function of the corresponding relevance score, modifies the color property of each member rectangle as a function of the corresponding change score, and modifies the border thickness property of each member rectangle as a function of the corresponding surprisingness score.

2. The computer-readable storage media of claim 1, wherein the user-interface component further receives threshold input data from a user, said input data defining a threshold visual property value, and wherein the diagram component displays member rectangles having a calculated first visual property value greater than the defined threshold visual property value.

3. The computer-readable storage media of claim 2, wherein defining a threshold visual property value includes defining a minimum threshold value and a maximum threshold value, and wherein the diagram component displays member rectangles having a calculated first visual property value between the minimum threshold and the maximum threshold values.

4. The computer-readable storage media of claim 1, wherein the interactive data diagram is a tree map.

5. The computer-readable storage media of claim 1 wherein the diagram component displays the one or more member rectangles according to their summary visual property value.

6. The computer-readable storage media of claim 1, wherein the diagram component displays the plurality of dimension rectangles adjacent to each other and displays the one or more member rectangles corresponding thereto within the dimension rectangles according to the calculated first visual property values.

7. A method for adjusting a display of a user interface (UI), said UI displaying data retrieved from a multi-dimensional data source, said multi-dimensional data source being organized according to a plurality of dimensions, said dimensions each including at least one member, said method comprising:

generating a hierarchical display structure for displaying information representative of a selected set of dimensions from the plurality of dimensions, said dimensions each having an initial visual property value defining a visual appearance of the respective dimension as a function of one or more members included therein values to maintain an original appearance of the hierarchy;

receiving a user-specified change to the display structure, said user-specified change defining requested drill down data from at least one of the dimensions of the selected set of dimensions, said requested drill down data comprising information representative of a selected member of the at least one of the dimensions;

calculating a new visual property value for each remaining dimension of the selected set of dimensions from which the drill down data was not requested, said calculated new visual property value being for remaining dimension of the selected set other than the at least one dimension of the selected set for a modified appearance of the hierarchy, said new visual property value defining a visual appearance of the respective remaining dimension as a function of drill down data and of the one or more members included therein corresponding to the selected member;

generating a new hierarchical display structure for displaying information representative of the remaining dimensions of the selected set of dimensions according to the new visual property values wherein the modified appearance is different from the original appearance of the hierarchy based on the removal of the at least one dimension of the selected set in response to calculating the new visual property value and without selection of new drill down data;

calculating one or more pattern factor scores for the members of the selected set of dimensions in response to a summary request received from a user, said one or more pattern factor scores including one or more of the following: calculating a relevance score, calculating a change score, and calculating a surprisingness score;

calculating a summary visual property value for the members as a function of the calculated one or more pattern factor scores, said summary visual property value being representative of at least one of the following: a size property, a color property, and border thickness property; and modifying the size properties of the members of the selected set of dimensions as a function of the relevance scores corresponding thereto, modifying the color properties of the members as a function of the change scores corresponding thereto, and modifying the border thickness properties of the members as a function of the surprisingness scores corresponding thereto.

8. The method of claim 7, further comprising receiving threshold input data from a user, said input data defining a threshold visual property value, and wherein generating the hierarchical display structure includes displaying members having an initial visual property value greater than the defined threshold visual property value.

9. The method of claim 8, wherein defining a threshold visual property value includes defining a minimum threshold value and a maximum threshold value, and wherein generating the hierarchical display structure includes displaying members having an initial visual property value between the minimum threshold value and the maximum threshold value.

10. The method of claim 7,
wherein generating the hierarchical display structure includes displaying the members according to the summary visual property value.

11. In a computer system having a graphical user interface (UI) for displaying data retrieved from a multi-dimensional data source, said multi-dimensional data source being organized according to a plurality of dimensions, said dimensions each including at least one member, a method for adjusting the display of the UI comprising:

generating a tree map displaying a plurality of dimension rectangles representative of a selected set of dimensions from the plurality of dimensions, said plurality of dimension rectangles each having at least one member rectangle representative of the at least one member included in the respective dimension, said dimension and member rectangles each having an initial visual property value defining a visual appearance of the respective dimension rectangle and corresponding member rectangle as a function of the retrieved data, said initial visual property data defining an original appearance of the tree map;

receiving a user-specified change to the display structure, said user-specified change defining requested drill down data from at least one of the dimension rectangles, wherein said requested drill down data comprises information representative of a selected member rectangle of at least one of the dimension rectangles;

calculating a new visual property value for each remaining dimension rectangle of the plurality of dimension rectangles from which the drill down data was not requested, said new visual property value defining a visual appearance of the respective remaining dimension rectangle as a function of drill down data and of the one or more member rectangles included therein corresponding to the selected member rectangle;

generating a new tree map for displaying information representative of the remaining dimension rectangles according to the new visual property values without at least one of the dimension rectangles and wherein the new tree map is different from the original appearance of the tree map based on the removal of the at least one dimension rectangles in response to calculating the new visual property value and without selection of new drill down data;

calculating one or more pattern factor scores for the members of the selected set of dimensions in response to a summary request received from a user, said one or more pattern factor scores including one or more of the following: calculating a relevance score, calculating a change score, and calculating a surprisingness score;

calculating a summary visual property value for the members as a function of the calculated one or more pattern factor scores, said summary visual property value being representative of at least one of the following: a size property, a color property, and border thickness property; and modifying the size properties of the members of the selected set of dimensions as a function of the relevance scores corresponding thereto, modifying the color properties of the members as a function of the change scores corresponding thereto, and modifying the border thickness properties of the members as a function of the surprisingness scores corresponding thereto.

12. The method of claim 11, further comprising receiving threshold input data from a user, said input data defining a threshold visual property value, and wherein generating the tree map includes displaying member rectangles having an initial visual property value greater than the defined threshold visual property value.

13. The method of claim 12, wherein defining the threshold visual property value includes defining a minimum threshold value and a maximum threshold value, and wherein generating the tree map includes displaying member rectangles having an initial visual property value between the minimum threshold value and the maximum threshold value.

14. The method of claim 11
wherein generating the new tree map structure includes displaying the member rectangles according to the summary visual property value.

* * * * *